United States Patent
Lu

(10) Patent No.: US 7,915,986 B2
(45) Date of Patent: Mar. 29, 2011

(54) HINGE ASSEMBLY AND PORTABLE ELECTRONIC DEVICES USING SAME

(75) Inventor: Pen-Uei Lu, Tu-Cheng (TW)

(73) Assignee: Chi Mei Communication Systems, Inc., Tu-Cheng, New Taipei (TW)

(*) Notice: Subject to any disclaimer, the term of this patent is extended or adjusted under 35 U.S.C. 154(b) by 305 days.

(21) Appl. No.: 12/133,526

(22) Filed: Jun. 5, 2008

(65) Prior Publication Data

US 2009/0167472 A1 Jul. 2, 2009

(30) Foreign Application Priority Data

Dec. 29, 2007 (CN) .......................... 2007 1 0203559

(51) Int. Cl.
*H01F 7/20* (2006.01)
*H01F 7/02* (2006.01)
*H01F 7/04* (2006.01)
*H04M 1/00* (2006.01)
*E05D 7/00* (2006.01)
*E05D 11/10* (2006.01)

(52) U.S. Cl. ........ 335/285; 335/219; 335/287; 335/288; 335/295; 335/296; 335/302; 335/306; 455/550.1; 455/575.3; 455/347; 455/348; 379/433.13; 16/221; 16/319; 16/320; 16/DIG. 14

(58) Field of Classification Search ............... 335/219, 335/234, 262, 285, 287, 288, 295, 296–298, 335/302, 305, 306; 455/550.1, 575.1, 575.3, 455/90.3, 347, 348, 351; 379/433.01, 433.11, 433.13, 440; 16/221, 319, 320, DIG. 14
See application file for complete search history.

(56) References Cited

U.S. PATENT DOCUMENTS

| | | | |
|---|---|---|---|
| 6,630,878 B2 * | 10/2003 | Pan et al. | 335/285 |
| 7,074,045 B2 * | 7/2006 | Kawahigashi et al. | 439/38 |
| 7,288,934 B1 * | 10/2007 | Ikarashi et al. | 324/207.21 |
| 2002/0119802 A1 * | 8/2002 | Hijii | 455/550 |
| 2002/0147026 A1 * | 10/2002 | Hsieh | 455/550 |
| 2003/0178901 A1 * | 9/2003 | Erten et al. | 310/112 |
| 2003/0179880 A1 * | 9/2003 | Pan et al. | 379/433.13 |
| 2005/0136970 A1 * | 6/2005 | Kim | 455/550.1 |
| 2005/0194384 A1 * | 9/2005 | Petit | 220/230 |
| 2005/0208984 A1 * | 9/2005 | Tang | 455/575.3 |
| 2006/0214756 A1 * | 9/2006 | Elliott et al. | 335/306 |
| 2007/0077971 A1 * | 4/2007 | Tu et al. | 455/575.3 |
| 2007/0077972 A1 * | 4/2007 | Tu et al. | 455/575.3 |

FOREIGN PATENT DOCUMENTS

CN  1382893 A  12/2002

* cited by examiner

*Primary Examiner* — Elvin G Enad
*Assistant Examiner* — Mohamad A Musleh
(74) *Attorney, Agent, or Firm* — Steven M. Reiss

(57) ABSTRACT

A hinge assembly (20) including a first magnetic member (21) and a second magnetic member (22) is described. The polarities of opposing end surfaces of the first magnetic member and the second member are different. The second magnetic member is configured for rotating relative to the first magnetic member to generate a magnetic moment. In addition, an exemplary portable electronic device (100) equipped with the hinge assembly is also described.

12 Claims, 12 Drawing Sheets

ND PORTABLE
HINGE ASSEMBLY AND PORTABLE ELECTRONIC DEVICES USING SAME

BACKGROUND

1. Field of the Invention

The present invention relates to a hinge assembly for portable electronic devices.

2. Discussion of the Related Art

With the development of communication, portable electronic devices, such as cellular phones, personal digital assistant (PDA), and so on, have become more and more popular. These days, the portable electronic devices provide an incredible array of functions, as well as a variety of the aesthetic appearances. Some models of the portable electronic devices are designed as folding type, which is referred to as "foldable" device from here on.

Generally, electronic components of the foldable electronic devices are mostly contained in a body of the foldable electronic devices. A cover of the foldable electronic devices contains fewer electronic components than that of the body. Various types of hinge assemblies are used to join the body and the cover and facilitate opening and closing of a foldable electronic device.

After frequent usage, the typical hinge may gradually lose the property of returning to the initial state following deformation, and the elastic force generated from a deformed spring inside the hinge assembly is consequently decreased. Therefore, the issue of elasticity decay may cause a decrease of life span of the hinge assembly. In addition, such hinge structure not only has a complex structure but also requires fixtures to assemble the cover and the body of the foldable electronic deices.

Therefore, there is room for improvement within the art.

BRIEF DESCRIPTION OF THE DRAWINGS

Many aspects of the hinge assembly can be better understood with reference to the following drawings. The components in the drawings are not necessarily to scale, the emphasis instead being placed upon clearly illustrating the principles of the present hinge assembly. Moreover, in the drawings, like reference numerals designate corresponding parts throughout the several views.

DETAILED DESCRIPTION OF THE EMBODIMENTS

Figure 1:
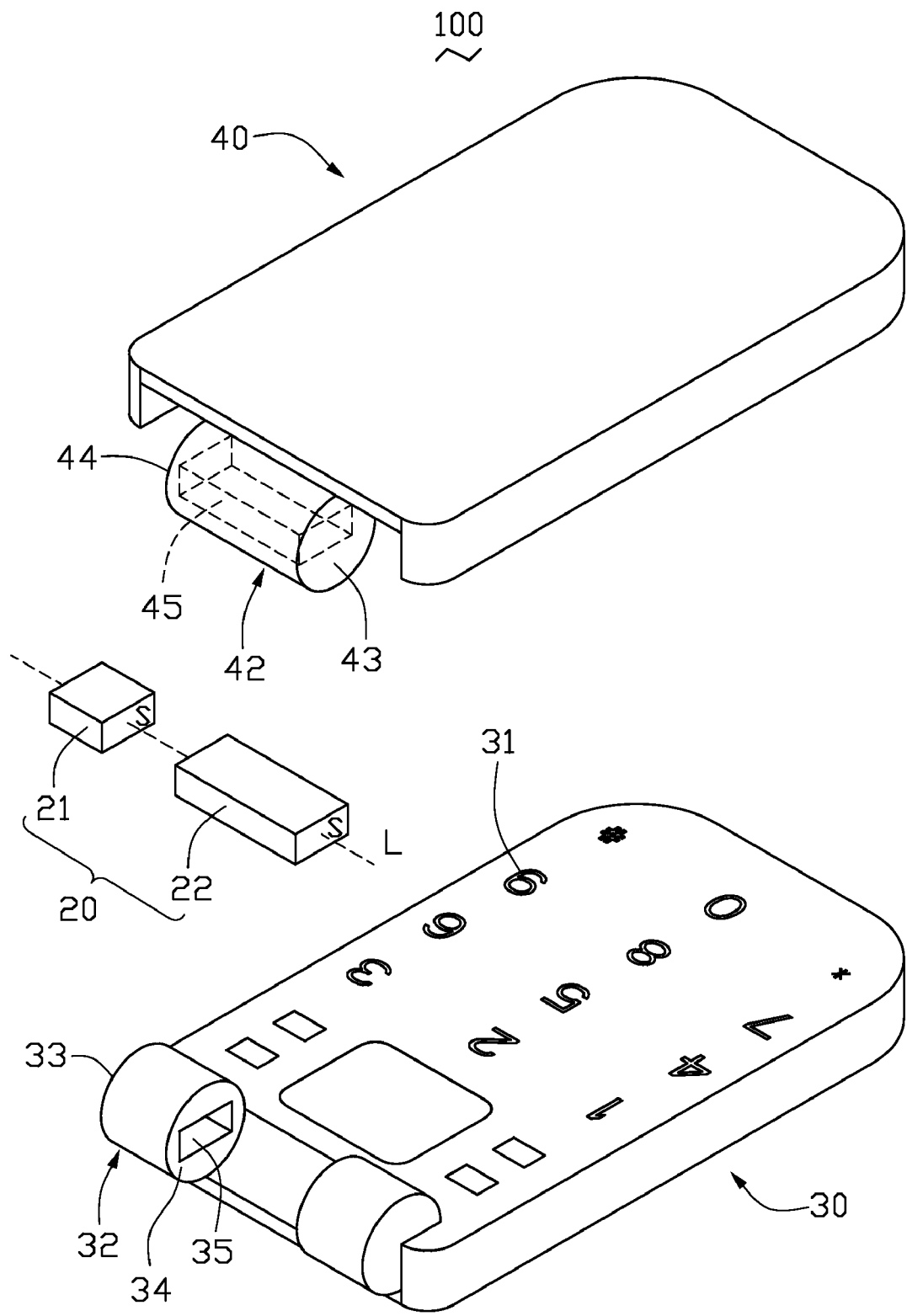
FIG. 1 is an isometric view of a portable electronic device according to a present embodiment.

Referring to the drawings in detail, FIG. 1 shows a portable electronic device 100 according to an exemplary embodiment. The cellular phone is taken here as an exemplary application for the purposes of describing details of the hinge assembly of the preferred embodiment. In an alternative embodiment, the cellular phone could be replaced by another portable electronic device, for example a personal digital assistant (PDA). While not shown in the drawings for simplicity, the portable electronic device 100 has a conventional hinge assembly 20 to positively connect a cover 40 to a body 30. The invention concerns the replacement of a conventional spring portion of the hinge with a magnetic structure.

Figure 2:
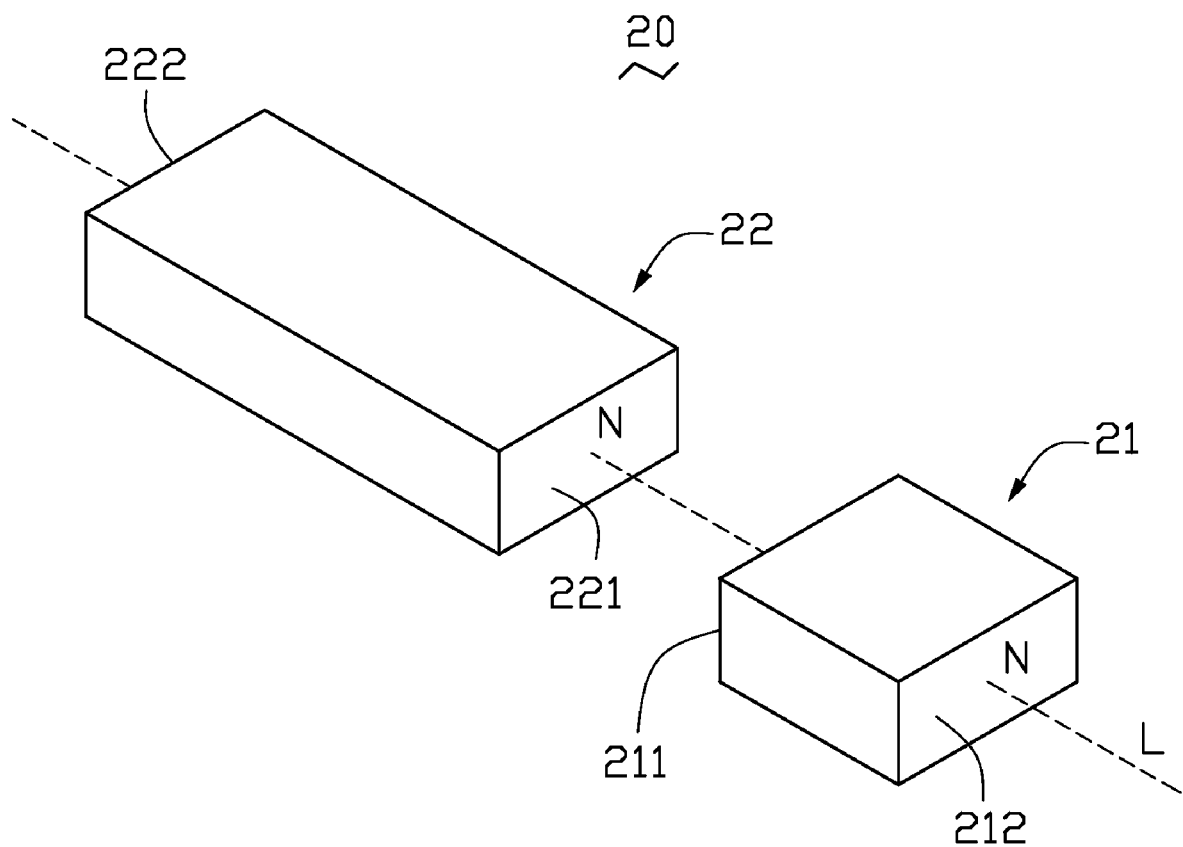
FIG. 2 is a partial exploded isometric view of the present hinge assembly, as used in the portable electronic device of FIG. 1.

FIG. 2 shows a partial exploded isometric view of the present hinge assembly 20. The hinge assembly 20 includes a first magnetic member 21 and a second magnetic member 22. The first magnetic member 21 is substantially rectangular shaped and includes a first end surface 211 and a second end surface 212 opposite to the first end surface 211. In the exemplary embodiment, the first end surface 211 is a south (S) magnetic pole, and the second end surface 212 is a north (N) magnetic pole. In alternative embodiment, the polarities of the first end surface 211 and the second end surface 212 can be exchanged.

The second magnetic member 22 is also substantially rectangular shaped and includes a first end surface 221 and a second end surface 222 opposite to the first end surface 221. In the embodiment, the first end surface 221 is a north (N) magnetic pole, and the second end surface 222 is a south (S) magnetic pole. Similarly, the polarities of the first end surface 221 and the second end surface 222 can be exchanged. In brief, the polarities of the adjacent end surfaces 211, 221 of the first magnetic member 21 and the second magnetic member 22 should be opposite. In addition, the dimension of the end surfaces 211, 221 of the first magnetic member 21 and the second magnetic member 22 are substantially equivalent to each other.

The first end surface 221 of the second magnetic member 22 and the first end surface 211 of the first magnetic member 21 have opposite polarities so that the first and second magnetic members 21, 22 are attracted/attached to each other due to magnetism therebetween. When the first end surface 221 of the second magnetic member 22 is entirely attached to the first end surface 211 of the first magnetic member 21, the hinge assembly 20 may be referred to as being in an "entirely attached state".

Figure 8:
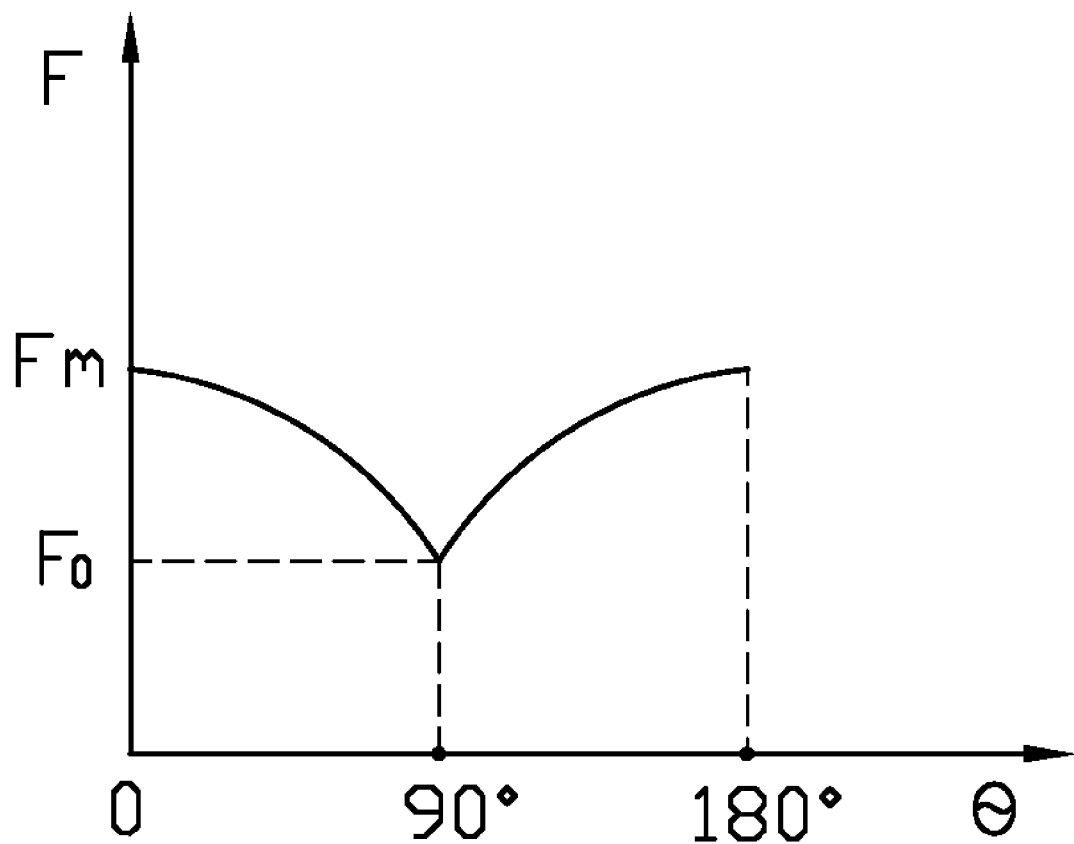
FIG. 8 shows the magnetic force F measurement for the hinge assembly of FIG. 2, wherein the y-axis indicates the magnetic force F, and the x-axis indicates the rotating angle θ of the second magnetic member relative to the first magnetic member.
Figure 9:
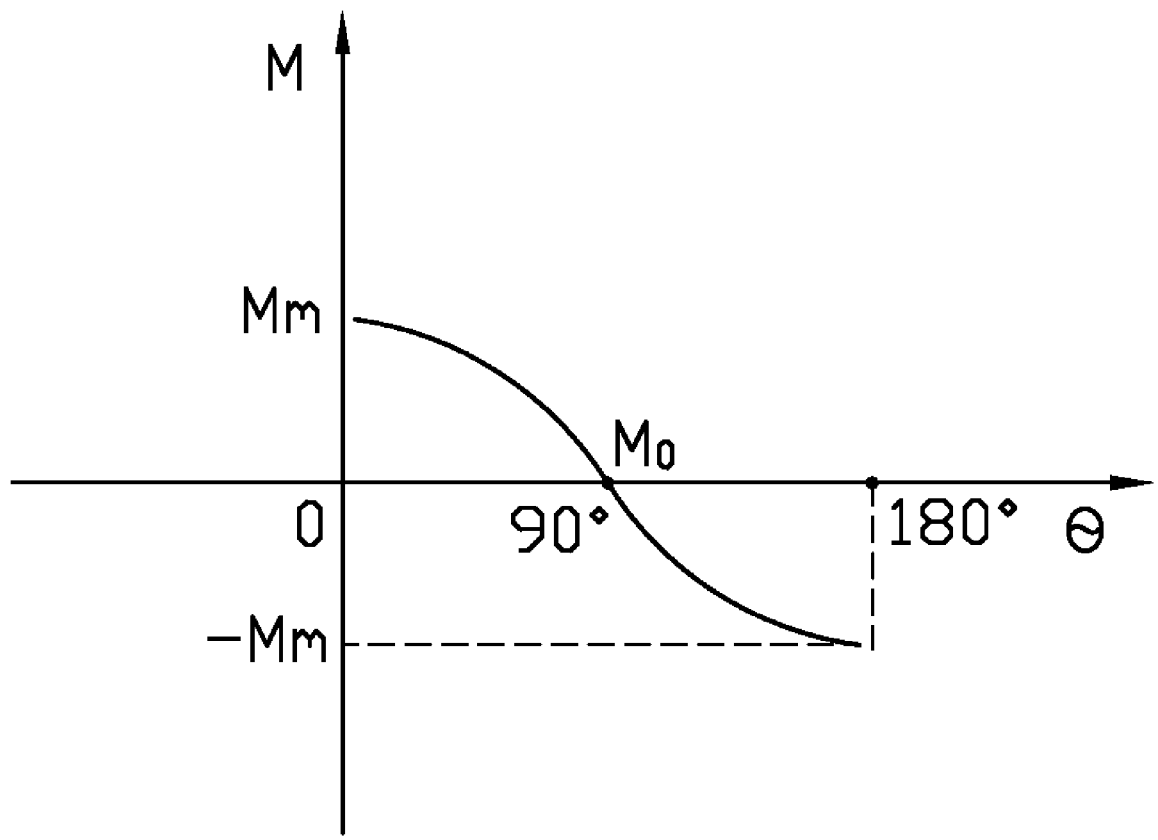
FIG. 9 shows the magnetic moment M measurement for the hinge assembly of FIG. 2, wherein the y-axis indicates the magnetic moment M, and the x-axis indicates the rotating angle θ of the second magnetic member relative to the first magnetic member.

The magnetism applied to the second magnetic member 22 by the first magnetic member 21 includes a magnetic force F parallel to an axis L and a magnetic moment M for rotating the second magnetic member 22 relative to the first magnetic member 21. FIGS. 8 and 9 respectively show the variation of the magnetic force F and the magnetic moment M between the first magnetic member 21 and the second magnetic member 22. The x-axis of FIGS. 8 and 9 refer to a rotating angle θ of the second magnetic member 22 relative to the first magnetic member 21 (hereinafter referred to as "the rotating angle θ"). The y-axis of FIGS. 8 and 9 respectively indicate the variation of the magnetic force F and the magnetic moment M.

Figure 3:
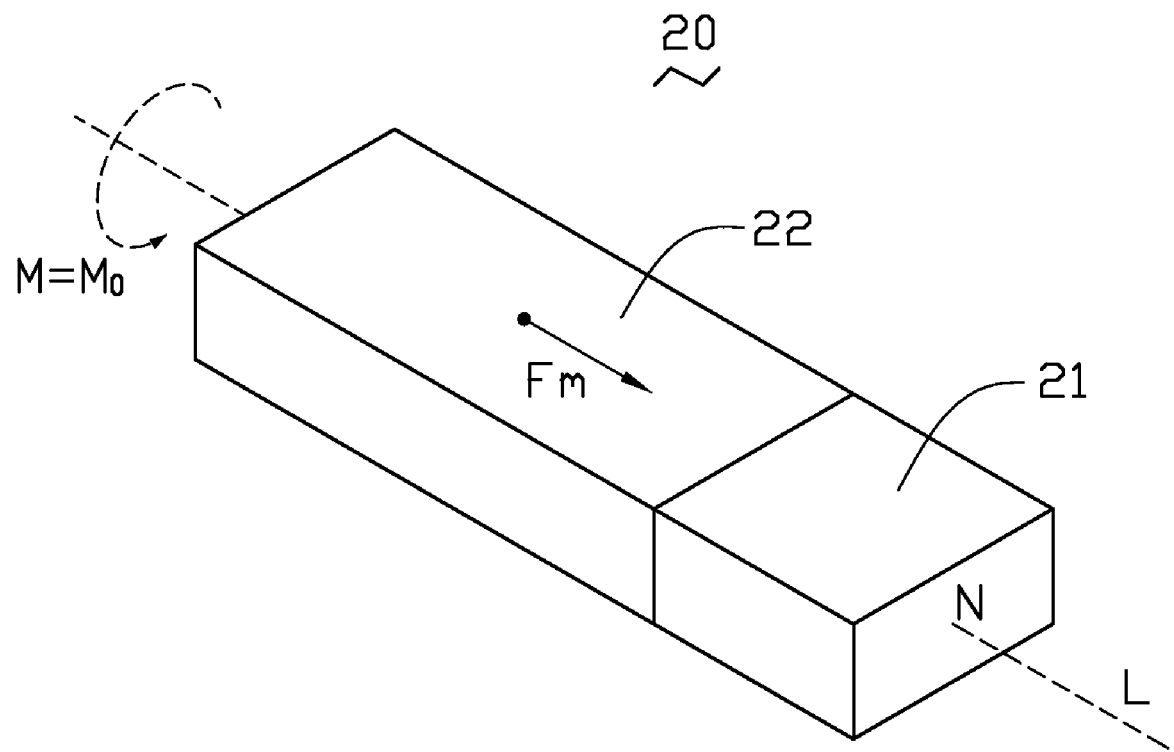
FIG. 3 is a partial assembled isometric view of the hinge assembly of FIG. 2.

FIG. 3 shows the hinge assembly 20 in the entirely attached state, which means the rotating angle θ is zero. Also referring to FIGS. 8 and 9, the magnetic force F reaches its maximum, i.e., $F_m$ when the hinge assembly 20 is in the entirely attached state, and the magnetic moment M reaches its minimum, i.e., $M_0$ when the rotating angle θ equals to 90 degrees.

FIGS. 4 through 7 show the rotation of the second magnetic member 22 in a clockwise direction by an external force. During the rotation, the magnetic force F matingly attaches the second magnetic member 22 to the first magnetic member 21.

Figure 4:
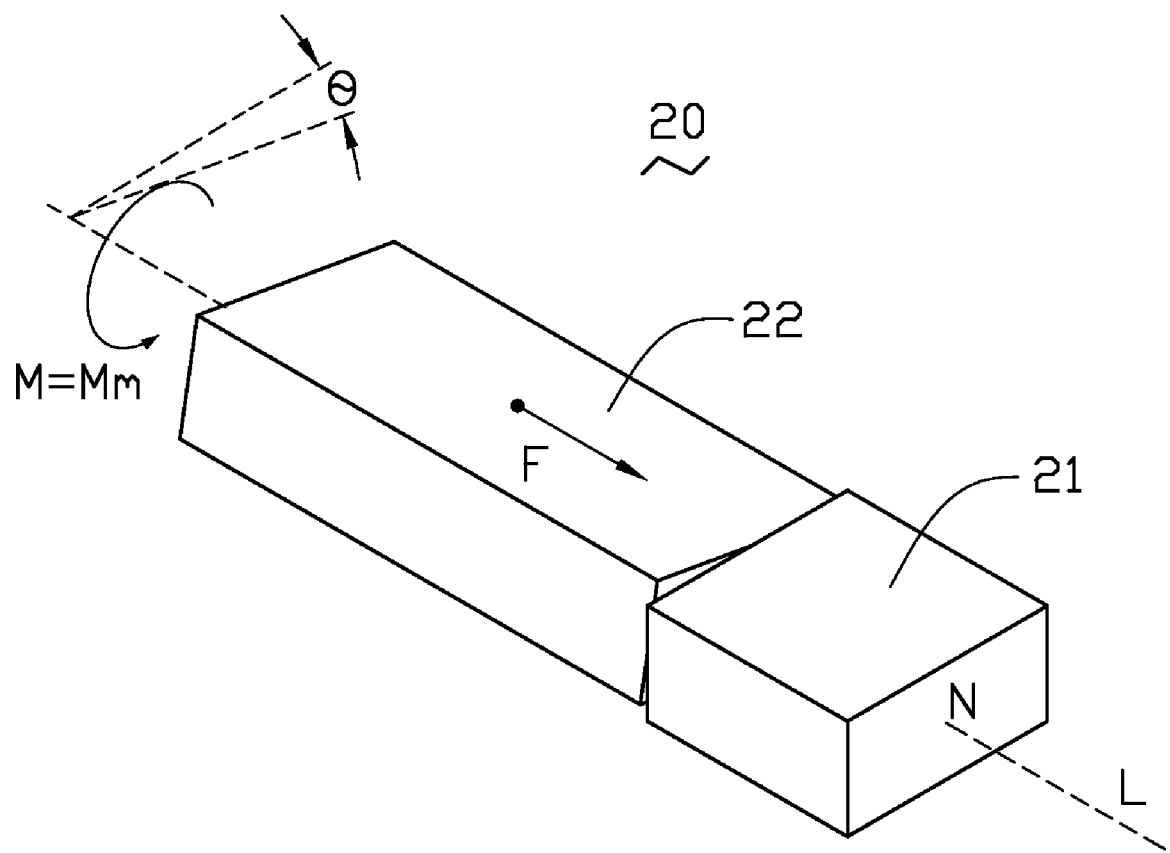
FIGS. 4-7 are schematic views respectively showing the rotating process of the hinge assembly of FIG. 2.
Figure 5:
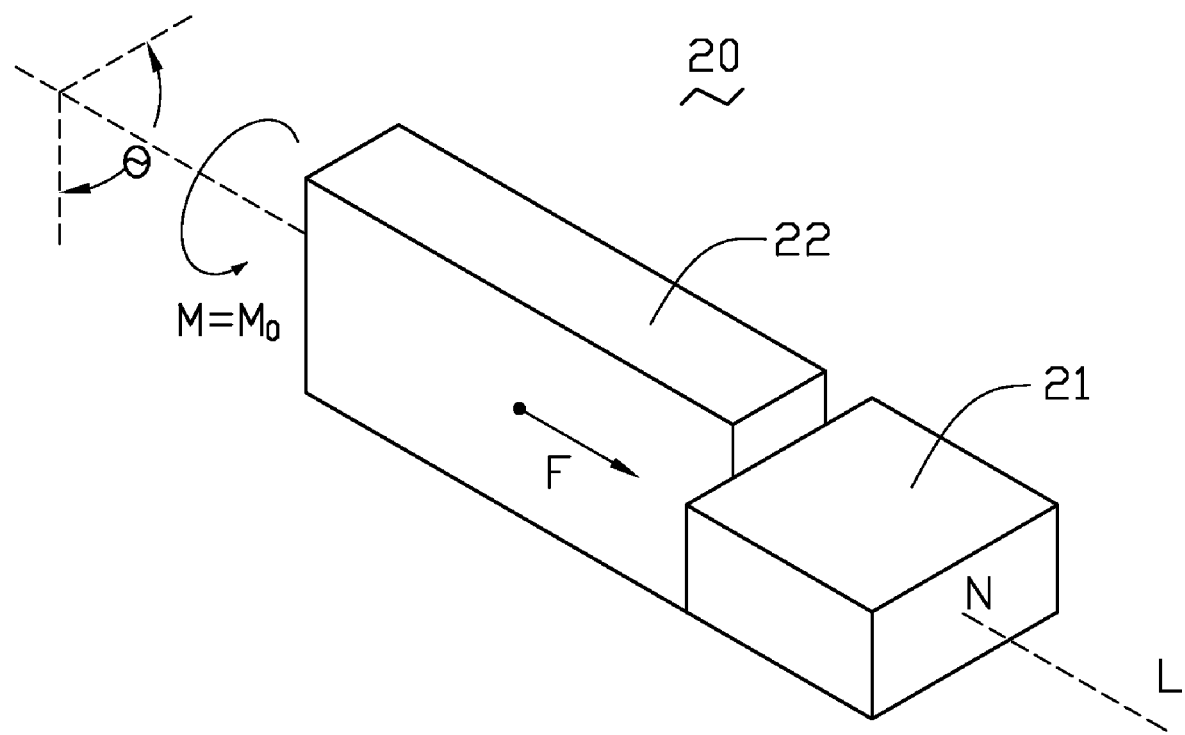
Figure 6:
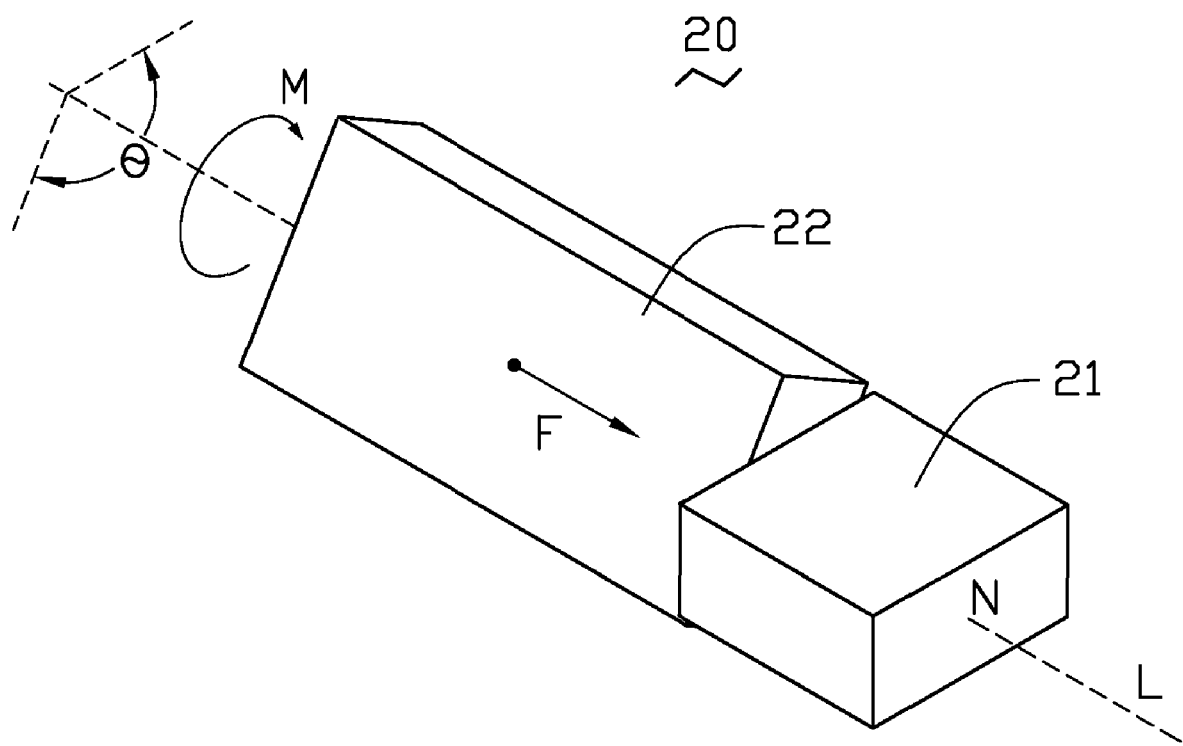
Figure 7:
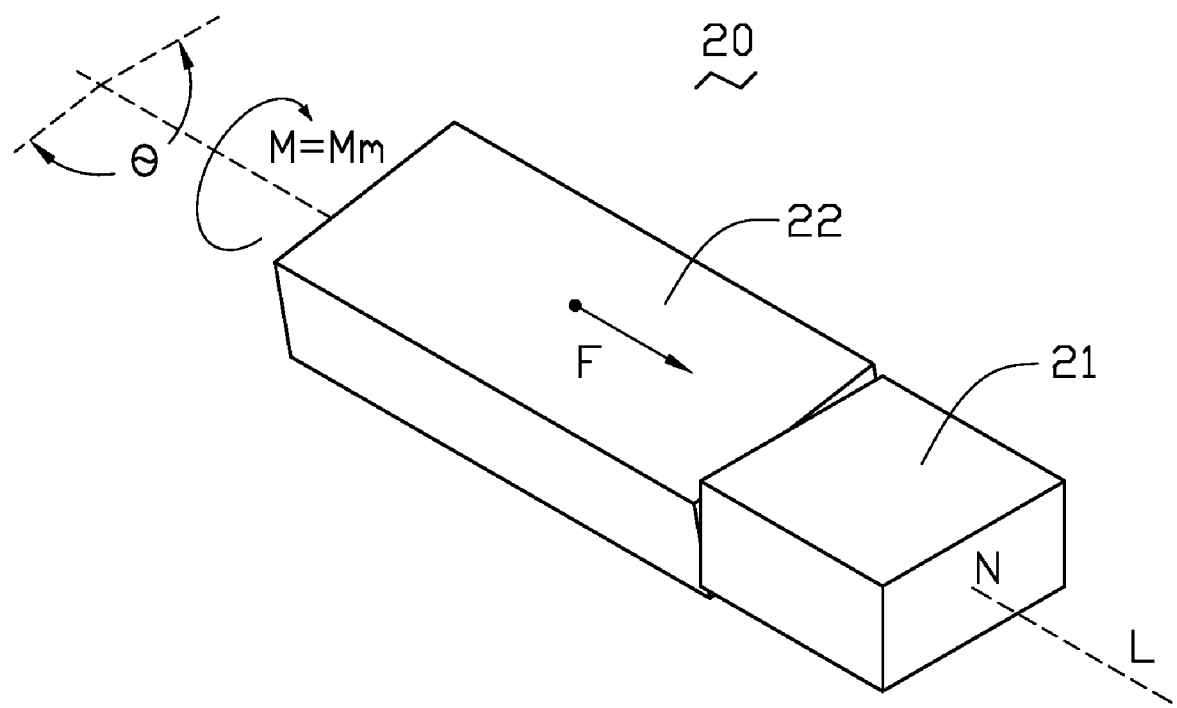

As the rotating angle θ changes from 0 degree to 90 degrees, the magnetic force F gradually decreases, and the magnetic force F reaches its minimum $F_0$ when the angle θ equals to 90 degrees as shown in FIG. 5. The second magnetic member 22 is further rotated by external force as shown in FIGS. 6 and 7 until the angle θ equals to 180 degrees. During the rotation, the magnetic force F gradually increases until reaching its maximum $F_m$ when the angle θ equals to 180 degrees. As shown in FIGS. 4-5, the magnetic moment M is in a counterclockwise direction.

The variation of the magnetic moment M is different from that of the magnetic force F. In FIG. 3, when the hinge assembly 20 is in an entirely attached state, the magnetic moment M is at a minimum $M_0$, i.e. zero. However, the magnetic moment M abruptly reaches its maximum $M_m$ at the beginning of the rotating process as shown in FIG. 4. Afterward, as the second magnetic member 22 further rotates until the angle θ equals to 90 degree as shown in FIG. 5, the magnetic moment M gradually decreases. Referring to FIG. 9, when the angle θ equals to 90 degree and the magnetic moment M equals to zero, the hinge assembly 20 is in a dynamical balance state. That is to say, the second magnetic member 22 is in a motionless state.

Referring to FIG. 6, the second magnetic member 22 is further rotated by external force and thus the magnetic moment M gradually increases. At the moment, the magnetic moment M changes into a clockwise direction, which is in a same direction with the rotating direction of second magnetic member 22, so that the magnetic moment M is shown with minus (−) sign as shown in FIG. 9. In other words, the minus (−) as shown in FIG. 9 indicates change of direction of the magnetic moment M. Under the magnetic moment M, the second magnetic member 22 automatically rotates as shown in FIG. 7 until the second end surface is entirely attached to the first end surface 211 of the first magnetic member 21. As the angle θ is close to 180 degrees, the magnetic moment M again reaches its maximum $M_m$. However, the magnetic moment M abruptly reaches its minimum $M_0$ when the angle θ equals to 180 degree.

Referring back to FIG. 1, the body 30 is a substantially rectangular board including a plurality of keys 31 arranged thereon. The body 30 includes a first hinge receiving portion 32 arranged in one side of the body 30. The first hinge receiving portion 32 has an inner surface 34 with a substantially rectangular-shaped first receiving slot 35 and an exterior surface 33 opposite to the inner surface 34. The dimension of the first receiving slot 35 is substantially equivalent to that of the first magnetic member 21 so that the first magnetic member 21 can be received in the first receiving slot 35.

The cover 40 is substantially a rectangular board including a display 41 (referring to FIG. 11) arranged thereon and a second hinge receiving portion 42 arranged in one side of the cover 40 in accordance with the first hinge receiving portion 32 of the body 30. The second hinge receiving portion 42 has a substantially cylindrical-shaped inner surface 44 and an exterior surface 43 opposite to the inner surface 44. The inner surface 44 of the second hinge receiving portion 42 defines a substantially rectangular-shaped second receiving slot 45. The dimension of the second receiving slot 45 is substantially equivalent to that of the second magnetic member 22 so that the second magnetic member 22 can be received in the second hinge receiving portion 42.

As shown in FIG. 1, the south (S) magnetic pole of the first magnetic member 21 is configured to be arranged adjacent to the inner surface 34 of the first hinge receiving portion 32 of the body 30, and the north (N) magnetic pole of the second magnetic member 22 is adjacent to the inner surface 44 of the second hinge receiving portion 42 of the cover 40. In addition, the inner surface 44 of the second hinge receiving portion 42 of the cover 40 faces the inner surface 34 of the first hinge receiving portion 32 of the body 30. As a consequence, the first end surface 211 of the first magnetic member 21 and the first end surface 221 of the second magnetic member 22 which have opposite polarities are positioned adjacent to each other.

Figure 10:
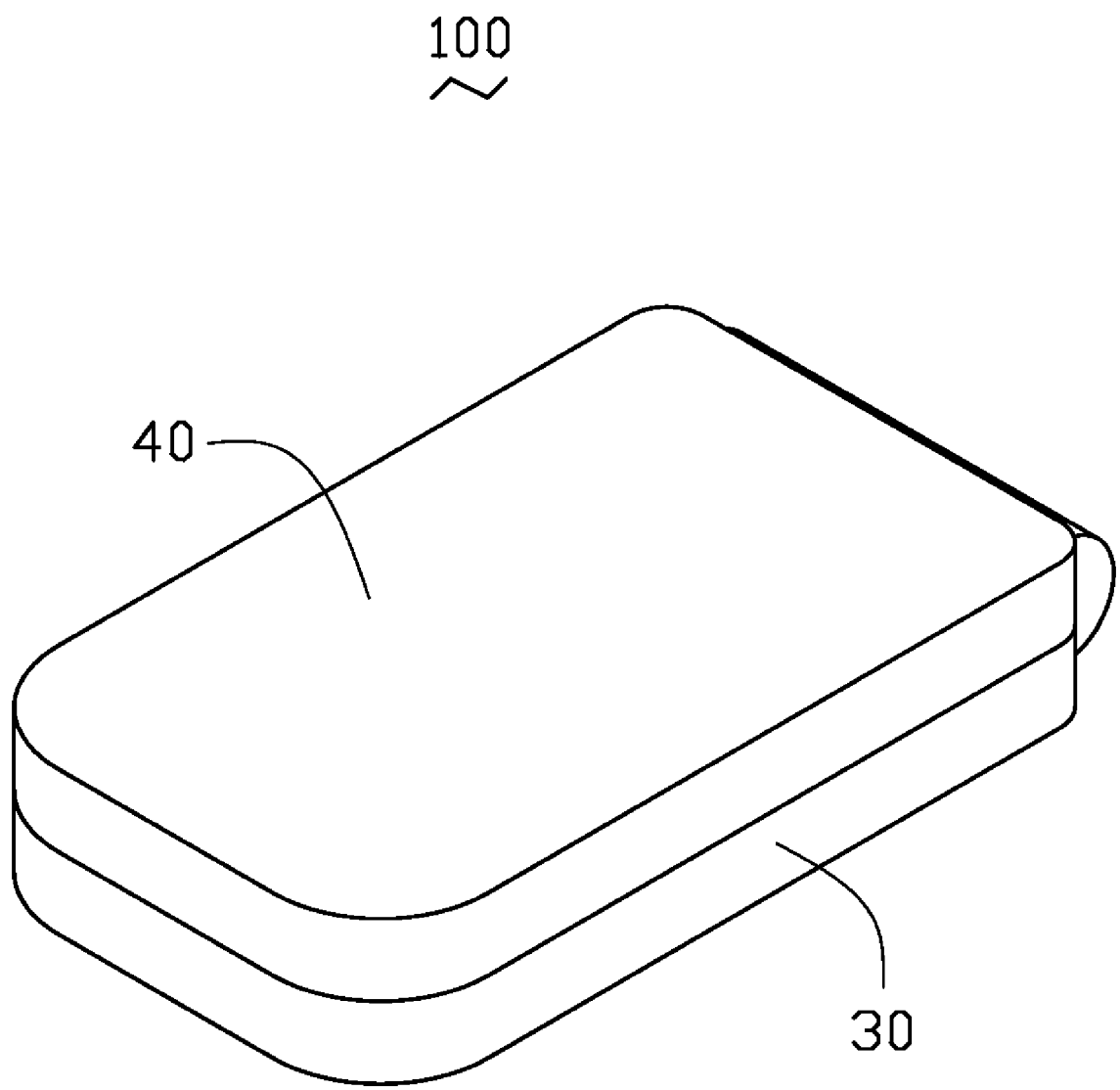
FIGS. 10-12 are schematic views respectively showing the portable electronic device of FIG. 1 in a closed, dynamic balance, and opened position.

When the portable electronic device 100 is in a closed position as shown in FIG. 10, namely, the cover 40 is overlaid on the body 30, the hinge assembly 20 is in the entirely attached state, namely, the first end surface 221 of the second magnetic member 22 is entirely attached to the first end surface 211 of the first magnetic member 21.

Figure 11:
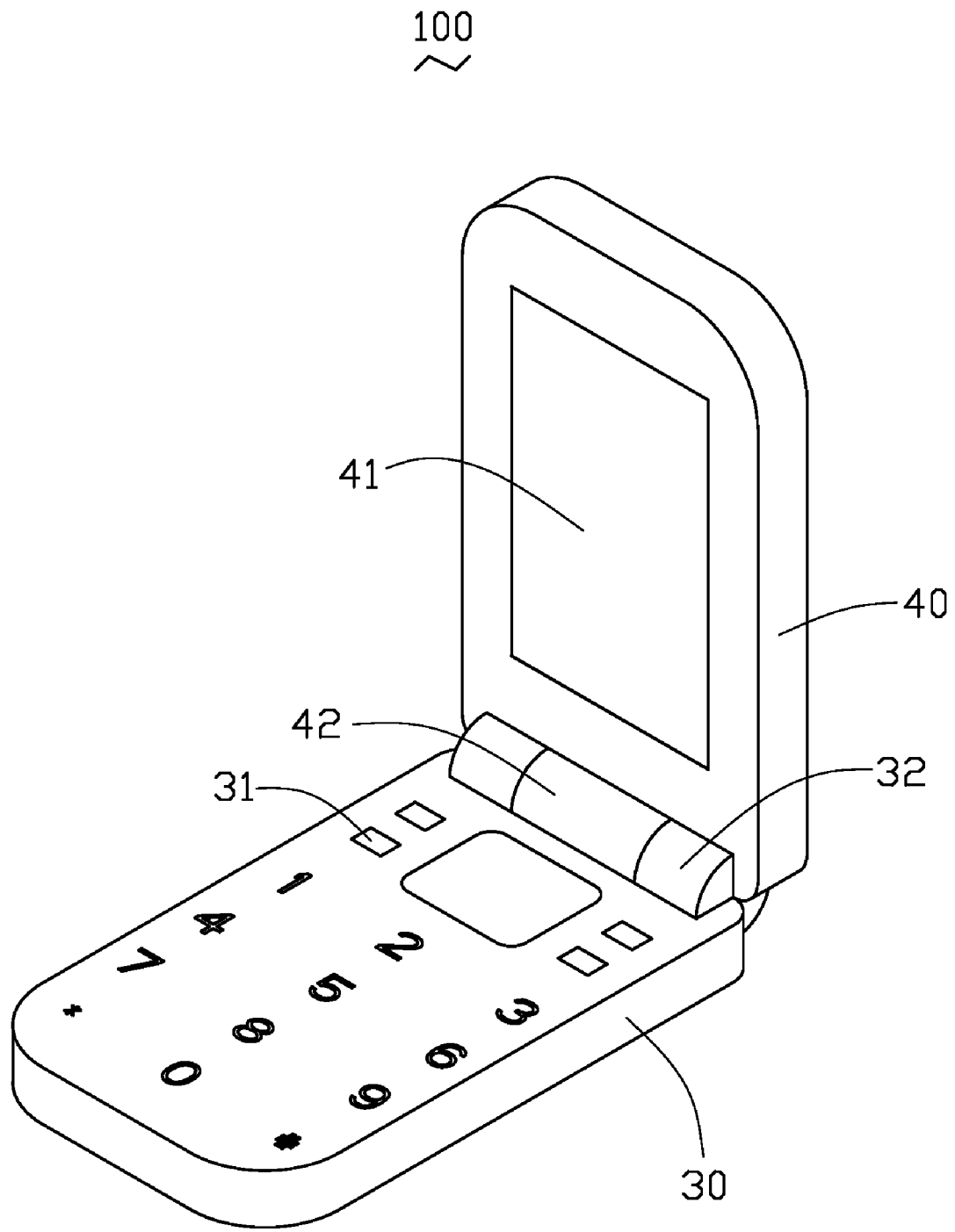
Figure 12:
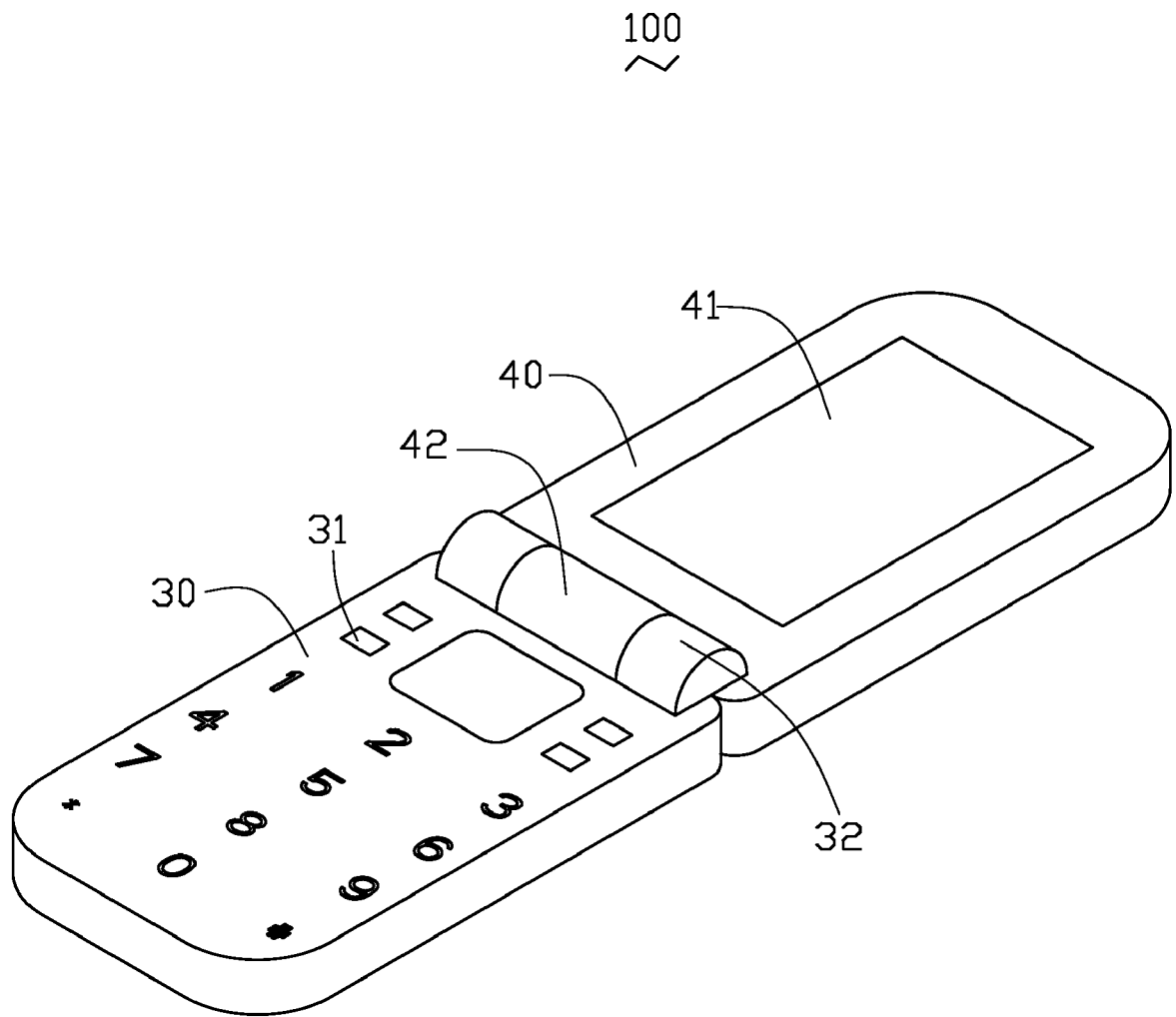

When the cover 40 of the portable electronic device 100 is unfolded relative to the body 30 by an external force in a clockwise direction, the second magnetic member 22 rotates in a clockwise direction relative to the first magnetic member 21. In the meantime, the magnetic moment M applied to the hinge assembly 20 is in a counter-clockwise direction until the cover 40 is perpendicular to the body 30 as shown in FIG. 11. At the aforesaid position, the magnetic moment M is zero, and the cover 40 is in the dynamical balance state relative to the body 30. Keeping on rotating the cover 40 in the clockwise direction, the magnetic moment M applied to the hinge assembly 20 changes oppositely, namely, the magnetic moment M is in the clockwise direction. After the external force is removed, the cover 30 automatically continuously rotates in the clockwise direction to a fully opened position as shown in FIG. 12 due to the magnetic moment M of the hinge assembly 20.

When the cover 40 of the portable electronic device 100 is folded relative to the body 30 by an external force in a counter-clockwise direction, the second magnetic member 22 rotates in a counter-clockwise direction relative to the first magnetic member 21 until the cover 40 is perpendicular to the body 30. At the moment, the magnetic moment M is zero, and the cover 40 is in a dynamical balance state relative to the body 30 as shown in FIG. 11. Keeping on folding the cover 40 in the counter-clockwise direction, the magnetic moment M applied to the hinge assembly 20 changes oppositely, namely, the magnetic moment M applied to the hinge assembly 20 is in the counter-clockwise direction. After the external force is removed, the cover 30 will be automatically continuously rotated in the counter-clockwise direction to a full closed position as shown in FIG. 10 due to the magnetic moment M.

Understandably, the south (S) magnetic pole of the first magnetic member 21 can be located to be adjacent to the exterior surface 33 of the first hinge receiving portion 32. Correspondingly, the north (N) magnetic pole of the second magnetic member 22 can be located to be adjacent to the exterior surface 43 of the second hinge receiving portion 42.

Understandably, the shapes of the end surfaces of the first magnetic member 21 and the second magnetic member 22 can also be in other shapes. In addition, the magnetic force F and the magnetic moment M are generated only if the angle θ of the second magnetic member 22 relative to the first magnetic member 21 is greater than zero.

The present hinge assembly 20 makes use of the generated magnetic moment M when the end surfaces 211, 221 of the first magnetic member 21 and the second magnetic member 22 are not entirely attached to each other to unfold the cover 40 of the portable electronic device 100. The structure of the hinge assembly 20 is simple, and the cost is low. Further, the process of assembling the hinge assembly 20 to the portable electronic device 100 can be achieved easily without utilizing additional fixtures.

As described above, the hinge assembly 20 may be applied in various portable devices, beyond the cellular phone illustrated, and/or with other devices needing a hinge assembly 20 that selectably facilitates the achievement of fully open and fully closed positions.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A portable electronic device, comprising:
   a body comprising a first hinge receiving portion having a first receiving slot;
   a cover coupled with the body by a hinge assembly, the cover comprising a second hinge receiving portion having a second receiving slot;
   the hinge assembly includes a first magnetic member having a first end surface, and a separate second magnetic member aligned with the first magnetic member and having a second end surface opposite to the first end surface, wherein the polarity of the first end surface is opposite to the polarity of the second end surface; and
   the first magnetic member is totally embedded in the first receiving slot, the second magnetic member is totally embedded in the second receiving slot, and when the second magnetic member rotates relative to the first magnetic member until the first end surface and the second end surface are askew, a magnetic moment is generated between the first end surface and the second end surface to further rotate the second magnetic member relative to the first magnetic member.

2. The portable electronic device as claimed in claim 1, wherein the first end surface is a south magnetic pole, the second end surface is a north magnetic pole.

3. The portable electronic device as claimed in claim 1, wherein the first end surface is a north magnetic pole, the second end surface is a south magnetic pole.

4. The portable electronic device as claimed in claim 1, wherein the first end surface and the second end surface are rectangular-shaped.

5. The portable electronic device as claimed in claim 1, wherein dimensions of the first end surfaces and the second end surface are substantially equal to each other.

6. The portable electronic device as claimed in claim 1, wherein a dimension of the first receiving slot is substantially equal to a dimension of the first magnetic member, and a dimension of the second receiving slot is substantially equal to a dimension of the second magnetic member.

7. A portable electronic device, comprising:
   a body comprising a first hinge receiving portion having a first receiving slot;
   a cover coupled with the body by a hinge assembly, the cover comprising a second hinge receiving portion having a second receiving slot;
   the hinge assembly includes a first magnetic member having a first end surface, and a second magnetic member aligned with the first magnetic member and having a second end surface opposite to the first end surface, wherein the polarity of the first end surface is opposite to the polarity of the second end surface, the first end surface and the second end surface are substantially planar; and
   the first magnetic member is totally embedded in the first receiving slot, the second magnetic member is totally embedded in the second receiving slot, and when the second magnetic member rotates relative to the first magnetic member until the first end surface and the second end surface are askew, a magnetic moment is generated between the first end surface and the second end surface to further rotate the second magnetic member relative to the first magnetic member.

8. The portable electronic device as claimed in claim 7, wherein the first end surface is a south magnetic pole, the second end surface is a north magnetic pole.

9. The portable electronic device as claimed in claim 8, wherein the first end surface is a north magnetic pole, the second end surface is a south magnetic pole.

10. The portable electronic device as claimed in claim 8, wherein the first end surface and the second end surface are rectangular-shaped.

11. The portable electronic device as claimed in claim 8, wherein dimensions of the first end surfaces and the second end surface are substantially equal to each other.

12. The portable electronic device as claimed in claim 8, wherein a dimension of the first receiving slot is substantially equal to a dimension of the first magnetic member, and a dimension of the second receiving slot is substantially equal to a dimension of the second magnetic member.

* * * * *